United States Patent Office 3,647,751
Patented Mar. 7, 1972

3,647,751
POLYARYLETHER-SULPHONES
Gerhard Darsow, Krefeld-Uerdingen, Germany, assignor to Farbenfabriken Bayer Aktiengesellschaft, Leverkusen, Germany
No Drawing. Filed May 19, 1970, Ser. No. 38,870
Claims priority, application Germany, June 25, 1969,
P 19 32 067.3
Int. Cl. C08g 23/24
U.S. Cl. 260—49    7 Claims

ABSTRACT OF THE DISCLOSURE

New polyaryl ether sulphones are provided which are valuable thermoplastic resins and which are the reaction products of molar amounts of dihalo-diphenyl-disulphone-aryls and of alkali metal bis-phenolates.

---

The invention relates to polyarylether-sulphones of recurring units of Formulae I or/and II

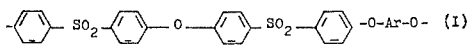  (I)

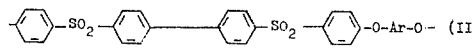  (II)

wherein

Ar is a diphenylene or naphthylene radical which is optionally substituted by alkyl groups or halogen atoms, or a polynuclear divalent radical of the formula

  (III)

wherein the aromatic nuclei can carry further substituents as hereinafter defined, and
Z is a divalent aliphatic, cycloaliphatic or araliphatic radical with 1–8 carbon atoms or is —O—, —S—, —SO—, —SO$_2$— or —CO—, the mean molecular weights of the polyarylether-sulphones being from about 1500 to about 120,000.

The melting range of these new polyethers in general lies between about 110° C. and about 380° C. The products are colourless to yellow-brown in colour and are soluble in, for example, dimethylformamide, dimethylsulphoxide, dimethylacetamide and N-methyl-2-pyrrolidone. They have good stability to oxidation and acid and basic hydrolysis and possess good mechanical properties as well as good dimensional stability over a wide temperature range. They can be used with advantage as resins or lacquers, or in shaped articles including films and fibres, and other shaped articles manufactured by the injection moulding, extrusion and compression moulding processes, especially in cases where high temperature resistance and advantageous mechanical properties are of importance, as for example in the textile and electrical industry, in the construction of rail vehicles and motor vehicles, and in shipbuilding and aircraft construction.

The invention also relates to a process for the production of the new polyethers in which molar amounts of dihalo-diphenyl-disulphone-aryls of the formula

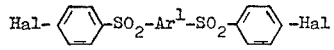  (IV)

wherein

Hal is chlorine or fluorine and
Ar$^1$ is a diphenylene or diphenyl-ether radical, and of bis-phenolates of the formula

  (V)

wherein Me is an alkali metal, are reacted in a strongly polar organic solvent at temperatures from about 80° to about 220° C., preferably between about 120° and about 180° C.

Examples of dihalo-diphenyl-disulphone-aryls of Formula IV are 4,4'-bis-(4-chlorophenyl-sulphone)-diphenyl-ether,
4,4'-bis-(4-fluorophenyl-sulphone)-diphenyl-ether,
4,4'-bis-(4-chlorophenyl-sulphone)-diphenyl, and
4,4'-bis-(4-fluorophenyl-sulphone)-diphenyl.

Examples of diphenols are binuclear diphenols, for example dihydroxydiphenyls or dihydroxynaphthalenes, and bisphenols of the formula

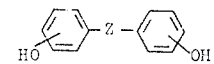  (VI)

wherein Z denotes a divalent aliphatic, cycloaliphatic or araliphatic radical with 1–8 C atoms or denotes —O—, —S—, —SO—, —SO$_2$— or —CO—.

As examples there may be mentioned: bis-(4-hydroxyphenyl)-methane, 1,1 - bis - (4 - hydroxyphenyl) - cyclohexane, bis - (4 - hydroxyphenyl) - phenylmethane, 4,4' - dihydroxydiphenyl - ether, -sulphide, -sulphoxide and -sulphone, 4,4' - dihydroxybenzophenone, 2,2-bis-(4-hydroxyphenyl) - propane, 4,4' - dihydroxydiphenyl and mixtures of these.

Apart from the hydroxy groups, the aromatic nuclei can carry additional substituents, for example alkyl and alkoxy groups with 1–4 C atoms and halogen atoms, with the restriction that these substituents do not impair the possible reactions of the hydroxyl group by steric or other hindrance.

Possible cations for the diphenolates are those of the metals of the first main group of the periodic system. The sodium and the potassium salts are preferred.

Amongst suitable strongly polar organic solvents, those of the sulphoxide or sulphone series, for example diethylsulphoxide, diphenylsulphoxide and dimethylsulphone, but preferably dimethylsulphoxide and tetramethylsulphone, may be mentioned.

In order to carry out the process, an equimolar amount of the dihalogeno-diphenyl-disulphone-aryl and of the dialkali phenolate is introduced into one of the solvents mentioned or into a mixture of the solvents and reacted at about 80° C. to about 220° C., preferably about 120° C. to about 180° C., without the use of a special catalyst, with equimolar amounts of alkali halide being split off, to give the polyarylether-sulphones according to the invention.

To avoid oxidative side-reactions, the reaction is appropriately carried out under an inert gas atmosphere, for example nitrogen. If polyethers of high molecular weight are to be obtained, the water content of the reaction mixture must be less than 0.3% by weight.

Since the alkali salts of some diphenols can only be freed of adhering water with difficulty and it therefore frequently presents difficulties to lower the water content of the reaction mixture to below 0.3% by weight when following the procedure mentioned, the dialkali phenolates are preferably manufactured in situ, by dissolving the bisphenol, in an apparatus continuously flushed with nitrogen, in an adequate amount of the polar solvent to be used for the subsequent reaction, and adding the stoichiometric amount of alkali hydroxide in a solid form or in aqueous solution, heating the mixture for some time, for example 4–8 hours, to about 120° C. to about 160° C., and thus distilling off the water contained in the mixture and/or the water liberated during the salt formation. In order to achieve more rapid dehydration of the system it is advisable to add an additional solvent, for example benzene, toluene or chlorobenzene, and to distill the water out of the mixture azeotropically, optionally also under reduced pressure, with the additional solvent.

The stoichiometric amount of the dihalogeno-diphenyl-disulphone-aryl is then added, appropriately as a melt or in an inert anhydrous solvent, such as benzene, toluene or chlorobenzene, to the dehydrated solution of the phenolate in the polar solvent, at a temperature of 120–160° C.

The condensation then takes place by heating this mixture for several hours, for example 2 to 12 hours, to the reaction temperatures mentioned. In the course of this, the alkali halide formed in the condensation separates out as an insoluble salt; it can be separated from the polymer solution in a simple manner by filtering off or centrifuging off. The polymer solution is cooled and then mixed either with water or with a lower alcohol, such as methanol or ethanol. Hereupon the polyarylether-sulphone separates out in a solid form. It is separated off and washed thoroughly with water to remove remnants of salt and solvent.

EXAMPLE 1

Polyarylether-sulphone of Formula

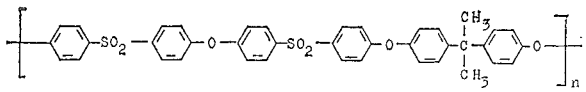

102.7 g. (0.45 mol) of 2,2-bis-(4-hydroxyphenyl)-propane are weighed out into a metal vessel and dissolved in 900 ml. of dimethylsulphoxide. The vessel is provided with a gas inlet tube, a stirrer, a thermometer, a reflux condenser and a water collecting device filled with toluene. A slow stream of nitrogen is passed through the apparatus in order to produce an inert gas atmosphere. 36 g. (0.9 mol) of sodium hydroxide in the solid form or as a concentrated aqueous solution are then added and after the sodium hydroxide has dissolved 150–200 ml. of toluene are added dropwise. The reaction mixture thus obtained is heated for 6–8 hours to 140°–150° C., in the course of which the water contained in the reaction mixture and the water produced during the formation of the phenolate distills continuously with the toluene, as an azeotrope, into the water collection device and separates out there, whilst the toluene runs back again into the reaction mixture. When all the water has been removed from the reaction system, the water collection vessel is emptied, the toluene is distilled off and a melt of 233.7 g. (0.45 mol) of 4,4′-bis-(4-chlorophenyl-sulphone)-diphenyl-ether is added at 120°–140° C. Thereafter a little anhydrous benzene is used for rinsing and the whole is gradually heated to 140°–160° C. whilst stirring. The reaction mixture is left at this temperature for 6 hours, in the course of which the sodium chloride produced in the condensation rapidly separates out. After completion of the reaction the cooled polymer solution is introduced into rapidly stirred water, whereupon the resulting polyarylether-sulphone separates out in a solid form. It is filtered off with suction, carefully washed and dried in vacuo. For purification, the resulting polyether is dissolved in methylene chloride and the solution filtered and poured into an excess of rapidly stirred methanol. Hereupon the polyether separates out in white flocks. It is filtered off with suction and dried.

The resulting polyether has a relative viscosity of 1.19 (measured on a solution of 0.5 g. in 100 ml. of methylene chloride at 25° C.) and softens at about 210°–230° C. The mean molecular weight, obtained from light scattering measurements on a solution in methylene chloride, is about 18,000.

EXAMPLE 2

Polyarylether-sulphone of Formula

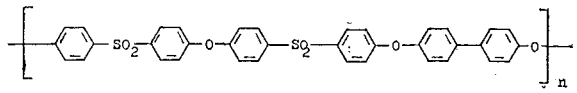

93.1 g. (0.5 mol) of 4,4′-dihydroxydiphenyl are introduced into an apparatus according to Example 1 and dissolved in 1000 ml. of dimethylsulphoxide. A slow stream of nitrogen is then passed through the apparatus and a solution of 40 g. (1 mol) of sodium hydroxide in 60 ml. of water is added. The mixture is warmed whilst stirring until a clear solution has been obtained and 250 ml. of toluene are then added. The mixture is heated to reflux temperature until no further water separates out in the water collection apparatus. The toluene is now distilled off, 100 ml. of anhydrous toluene are again added, this is also distilled off, and an anhydrous melt of 259.7 g. (0.5 mol) of 4,4′-bis-(4-chlorophenyl - sulphone)-diphenyl-ether is added at 130° C. Thereafter a little anhydrous toluene is used for rinsing and the whole is gradually heated to 150°–170° C. whilst stirring and left for one hour or for several hours at this temperature, depending on the desired degree of condensation. To obtain the reaction product, the cooled solution is added dropwise, after filtering off the sodium chloride which has separated out, to a 4-fold to 6-fold excess of ethanol. The precipitated product is filtered off, washed with ethanol and subsequently dried in vacuo.

After 6 hours' condensation the product has a mean molecular weight of about 16,000. It is a grey-white powder of melting range between 260° and 300° C.

EXAMPLE 3

Polyarylether-sulphone of Formula

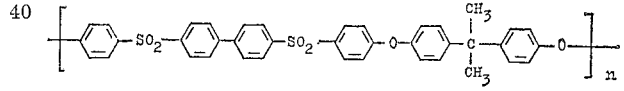

102.7 g. (0.45 mol) of 2,2-bis-(4-hydroxy-phenyl)-propane and 36 g. (0.9 mol) of sodium hydroxide in the solid form are introduced into an apparatus according to Example 1 and dissolved in 900 ml. of dimethylsulphoxide. 300 ml. of benzene are then added. The mixture is heated for 5–6 hours to 130° C., whereby the water produced during the salt formation is removed by azeotropic distillation with the benzene. When the solution is free of water, the benzene is distilled off, the residue which remains is heated to 140°–150° C., and 226.4 g. (0.45 mol) of 4,4′-bis-(4-chlorophenyl-sulphone)-diphenyl are added at this temperature. The whole is now heated to 160°–170° C. for 4–6 hours whilst stirring. After completion of the reaction the cooled polymer solution is introduced into a large excess of vigorously stirred water. The polyarylether-sulphone which separates out is filtered off with suction, washed and dried.

The resulting polyester has an average molecular weight of about 80,000 and softens between about 310° and 360° C.

The dihalogeno-diphenyl-disulphone-aryls of the above Formula IV, which are to be used for the manufacture of the new polyaryl-ethers, can for example be manufactured according to the process of German patent specification 701,954 by reaction of one mol of diphenyl or diphenyl-ether with about 2 mols of a p-halogenobenzene-sulphochloride or, preferably, of one mol of diphenyl-4,4′-disulphonic acid chloride or diphenyl-ether-4,4′-disulphonic acid chloride with about 2 mols of halogenobenzene, in the absence of moisture and in the presence of a small amount of iron-(III) chloride or some other Lewis catalyst at elevated temperature. The diphenyl-4,4′-disulphonic acid chloride or diphenyl-ether-4,4'-disulphonic acid chloride required for the latter process can be obtained in a simple manner by reaction of the diphenyl or of the diphenyl-ether with an excess of chlorosulphonic acid.

What I claim is:

1. Polyarylether-sulphones consisting essentially of recurring units of the formulae

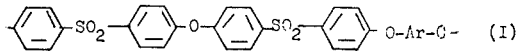

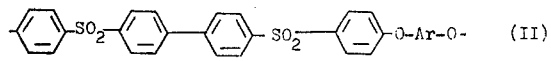

or a mixture of (I) and (II)
wherein
Ar is a diphenylene or naphthylene radical which is optionally substituted by alkyl groups or halogen atoms, or a polynuclear divalent radical of the formula:

wherein the aromatic nuclei can carry additional substituents as hereinbefore defined, and Z is a divalent aliphatic, cycloaliphatic or araliphatic radical with 1-8 carbons atoms, or is —O—, —S—, —SO—, —SO$_2$— or —CO—,
the mean molecular weights of the polyarylether-sulphones being from about 1500 to about 120,000.

2. Polyarylether-sulfones according to claim 1 having a melting point between 110 and 380° C.

3. A shaped article comprising a polyarylether-sulphone of claim 1.

4. The polyarylether-sulphones of recurring unit (I) of claim 1 wherein Ar is diphenylene.

5. The polyarylether-sulphone of claim 1 wherein said recurring unit is of the formula:

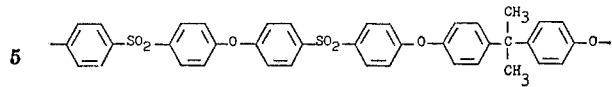

and the mean molecular weight thereof is about 18,000.

6. The polyarylether-sulphone of claim 1 wherein the recurring unit is of the formula

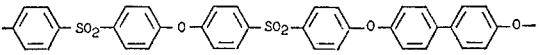

and the mean molecular weight thereof is about 16,000.

7. The polyarylether-sulphone of claim 1 wherein the recurring unit is of the formula

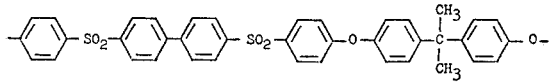

and the average molecular weight thereof is about 80,000.

References Cited

UNITED STATES PATENTS

| | | | |
|---|---|---|---|
| 3,264,536 | 8/1966 | Robinson et al. | 317—258 |
| 3,332,909 | 7/1967 | Farnham et al. | 260—47 |
| 3,431,230 | 3/1969 | Jackson, Jr. et al. | 260—33.8 |
| 3,446,654 | 5/1969 | Barth et al. | 117—123 |

WILLIAM H. SHORT, Primary Examiner

L. L. LEE, Assistant Examiner

U.S. Cl. X.R.

260—30.2, 30.8 DS, 32.6 R, 607 A